March 25, 1958   P. C. ZUMBUSCH   2,827,881
MECHANISM FOR ANGULAR ROTATION AND ADJUSTMENT
OF ONE SHAFT WITH RESPECT TO ANOTHER SHAFT
Filed April 28, 1955                                          4 Sheets-Sheet 1

PETER C. ZUMBUSCH
*INVENTOR.*

PETER C. ZUMBUSCH
INVENTOR.

BY Daniel H. Bobis
atty

PETER C. ZUMBUSCH
INVENTOR.

PETER C. ZUMBUSCH
INVENTOR.

United States Patent Office 2,827,881
Patented Mar. 25, 1958

2,827,881

MECHANISM FOR ANGULAR ROTATION AND ADJUSTMENT OF ONE SHAFT WITH RESPECT TO ANOTHER SHAFT

Peter C. Zumbusch, Upper Montclair, N. J., assignor to Worthington Corporation, Harrison, N. J., a corporation of Delaware Application April 28, 1955, Serial No. 504,461

6 Claims. (Cl. 121—39)

The present invention relates to an actuator and more particularly to an actuator for moving one shaft relative to another shaft or to a fixed reference point on one shaft.

In accordance with the present invention, a novel actuator or control means is provided for shifting or rotating one shaft with respect to another under the influence of fluid under pressure to change the angular displacement of a reference point on one shaft with respect to a reference point on the other shaft, and which actuator is provided with compensator means for cutting off the flow of fluid under pressure when the angular displacement of one shaft with respect to the other has been completed.

The invention will be understood from the following description when considered in connection with the accompanying drawings forming a part thereof and in which.

Figure 1:
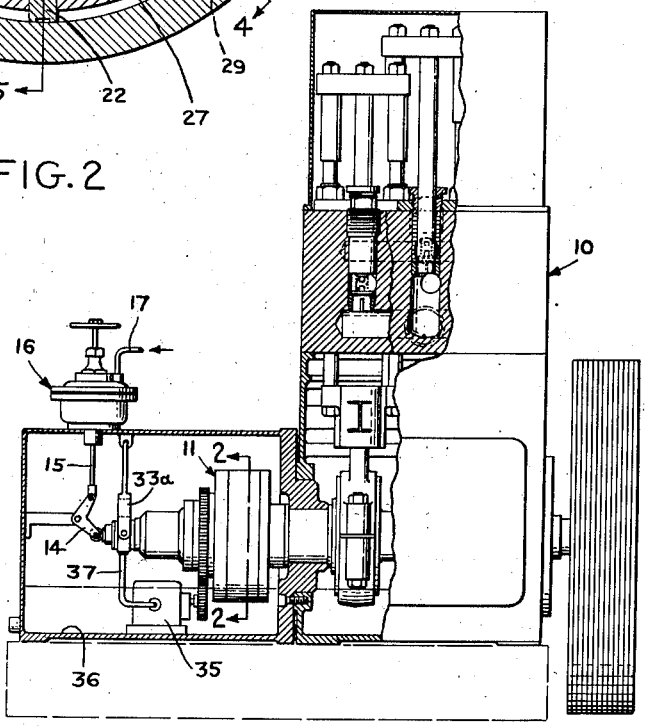
Figure 1 is a diagrammatic view of the invention shown for purposes of illustration embodied in a variable capacity plunger type pump.
Figure 3:
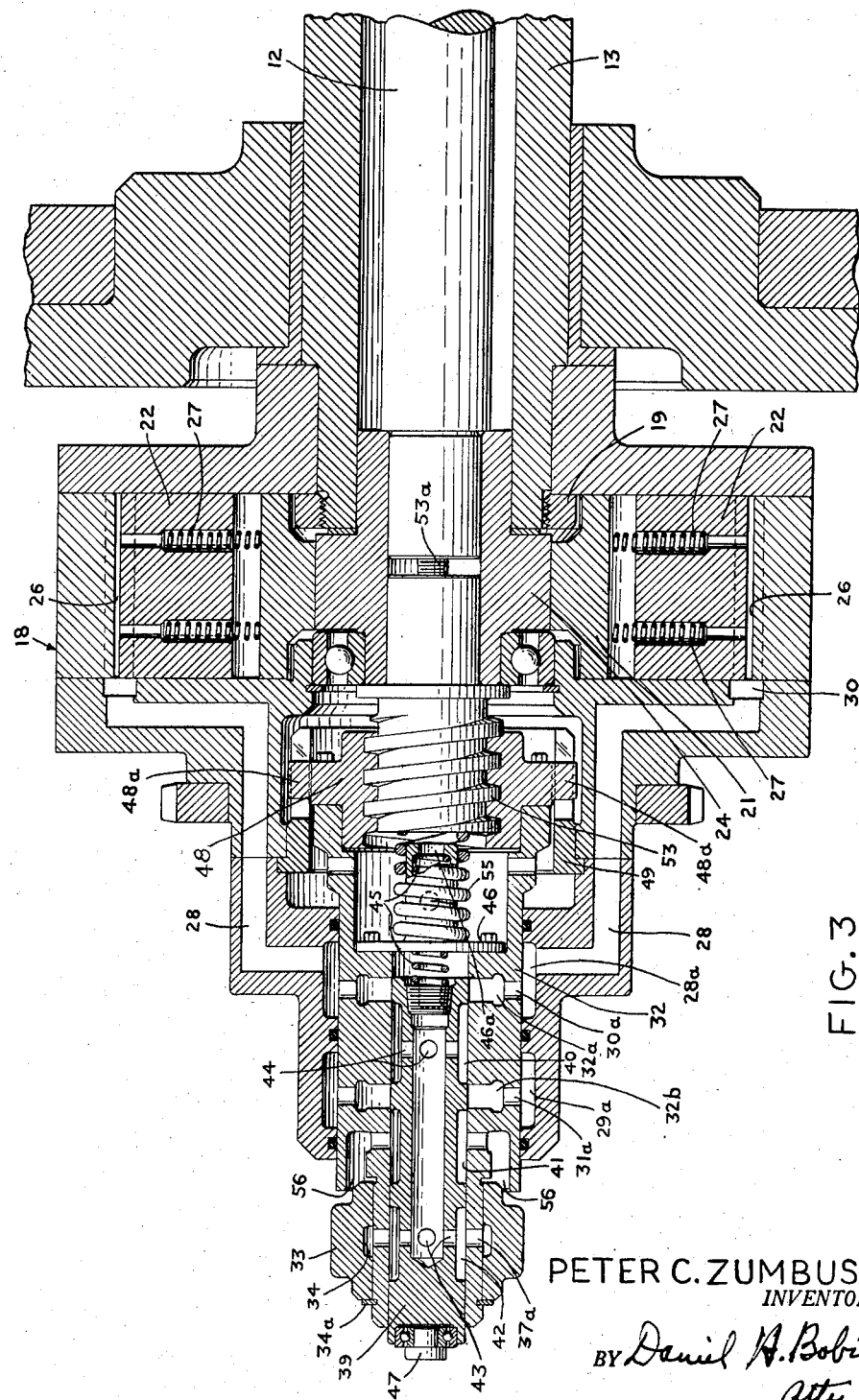
Figure 3 is an enlarged longitudinal section on line 3—3 of Figure 2, illustrating the actuator embodied in the present invention.

Referring to Figure 1, the reference numeral 10 designates a variable capacity plunger type pumpe having an actuator or control means 11 for angularly displacing or shifting a rotatable control shaft 12 (Fig. 3) with respect to a rotatable hollow eccentric shaft 13 (Fig. 3) in which the control shaft is positioned and which drives said shaft. The actuator 11 is acted on by a bell crank 14 moved by a rod 15 connected to a pressure control means 16. The pressure control means 16 may be actuated manually or by the action of fluid pressure in communication therewith through fluid pressure line 17 connected with a reference point in a system, for example the discharge or suction line of a pump.

Figure 2:
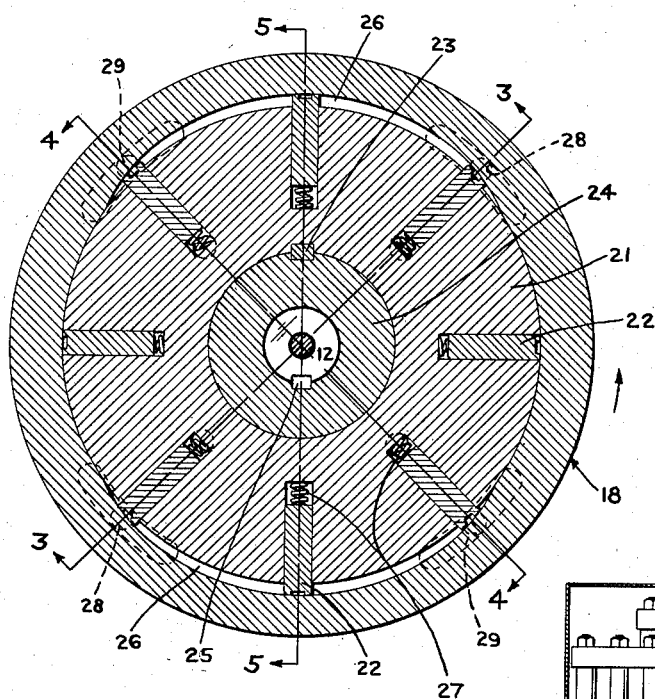
Figure 2 is an enlarged sectional view on line 2—2 of Figure 1 showing the actuating rotor embodied in the present invention.
Figure 5:
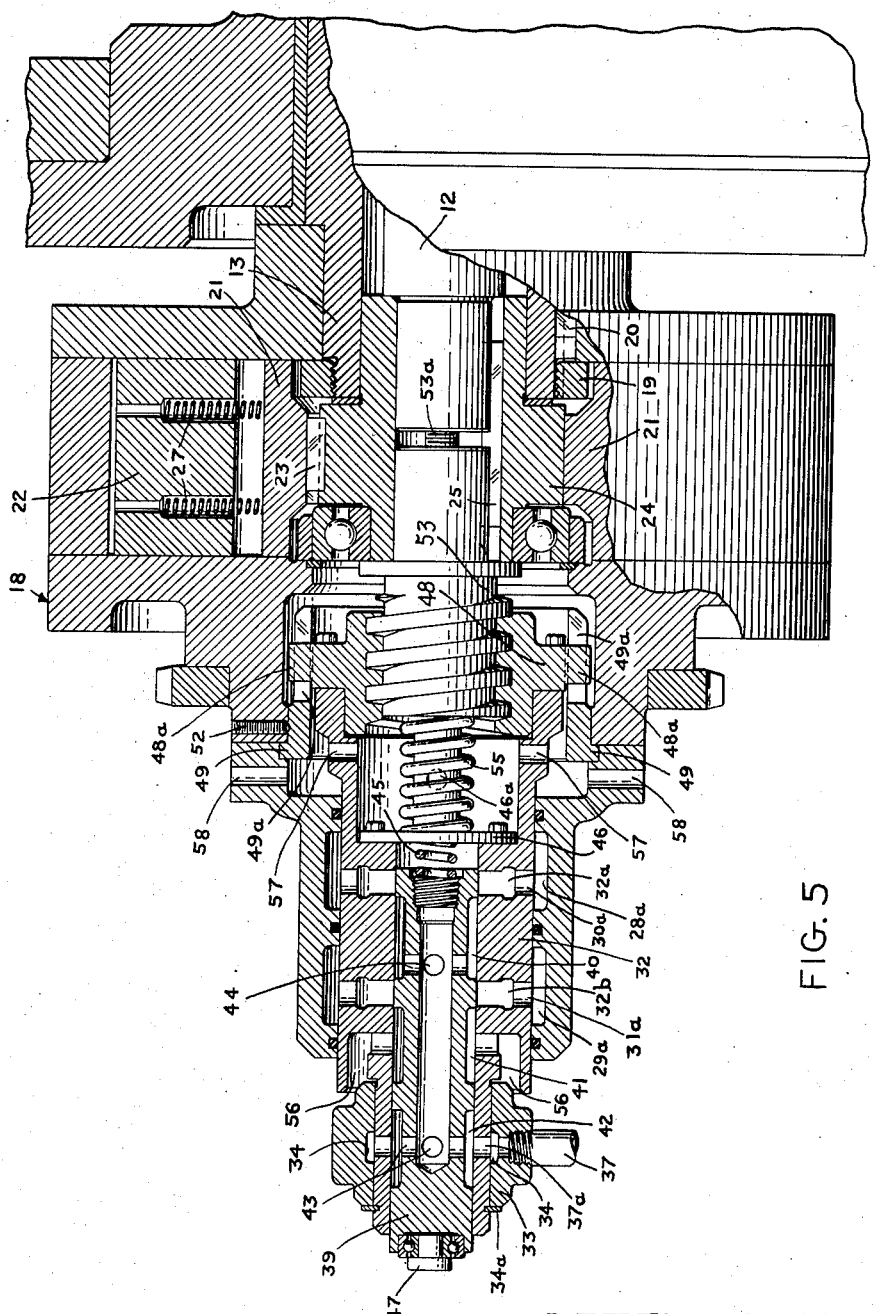
Figure 5 is an enlarged partly sectioned view on line 5—5 of Fig. 2.

Actuator 11 is disposed in a housing 18 fixed by a nut 19 (Figs. 3 and 5) and key 20 (Fig. 5) to eccentric shaft 13 for rotation therewith. A rotor or impeller 21 having a plurality of radially extending vanes 22 is disposed in housing 18. Rotor 21 is fixed by a key 23 (Figs. 2 and 5) to bushing or hub 24 on control shaft 12. Hub 24 extends within shaft 13 and is fixed by a key 25 (Figs. 2 and 5) to shaft 12. Circumferentially extending recesses 26 (Fig. 2) spaced 180° from one another are provided on the inner periphery of housing 18 adjacent rotor 21. Recesses 26 permit fluid under pressure to enter the housing and act against vanes 22 to rotate rotor 21 with respect to the housing, as hereinafter described. Springs 27 maintain the outer edge of vanes 22 in engagement with housing 18 and recesses 26.

Figure 4:
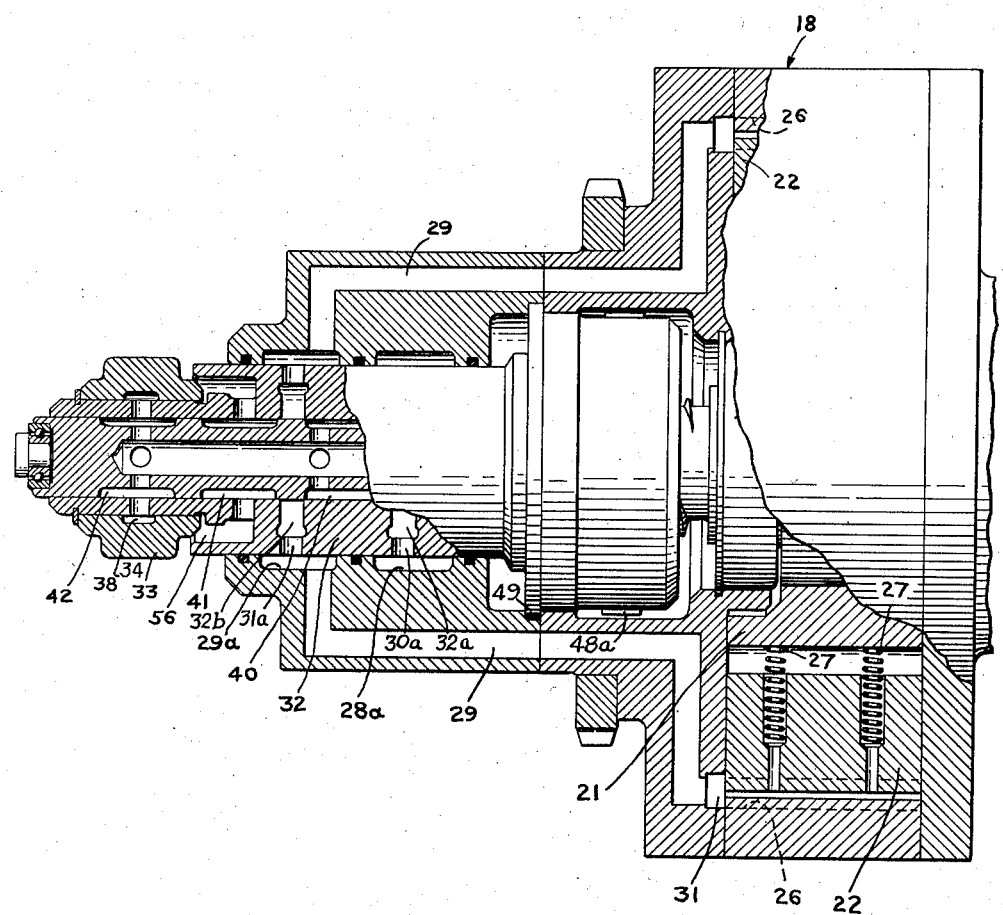
Figure 4 is an enlarged partly sectioned view on line 4—4 of Fig. 2.

A plurality of axially extending inlet and outlet passages 28 (Figs. 2 and 3) and 29 (Figs. 2 and 4) are disposed in housing 18 in communication with the opposite ends of recesses 26 through circumferentially extending inlets 30 and 31, respectively. Passages 28 are spaced 90° apart from passages 29, while passages 28 are spaced 180° apart from each other. The opposite ends of passages 28 and 29 communicate with recesses 28a and 29a, respectively, spaced apart from one another on the inner periphery of housing 18. Recesses 28a and 29a communicate through apertures 30a and 31a (Figs. 3 and 4) with continuous grooves 32a and 32b (Figs. 3 and 4) disposed on the inner periphery of a valve housing 32 disposed for axial slidable movement within actuator housing 18.

A floating sleeve 33 having an annular recess 34 on the inner periphery thereof is loosely mounted on a portion of housing 32 which extends beyond the end of the actuator housing 18 to permit rotation of the valve housing with respect thereto. An annular ring 34a disposed adjacent the outer end of the sleeve prevents the sleeve from moving axially off the housing. Sleeve 33 is supported by pivotal support means 33a (Fig. 1). Sleeve 33 communicates with an oil pump 35 (Fig. 1) disposed in the sump 36 (Fig. 1) of pump 10 through a line 37 and with the valve housing by apertures 37a disposed therein adjacent the sleeve.

A hollow piston or pilot valve 39 is disposed for slidable movement within the valve housing. Piston 39 is provided with a plurality of circumferentially extending recesses 40, 41 and 42 on the outer periphery thereof adjacent the inner, central, and outer portions, respectively of the piston. Oil from sleeve 33 is supplied to the piston through a plurality of inlet apertures 43 disposed therein adjacent recess 42, and is discharged therefrom through a plurality of outlet apertures 44 disposed adjacent recess 40.

A spring 45 is positioned adjacent the inner end of piston 39 mounted in a spring housing 46 fixed to valve housing 32. Spring housing 46 is provided with outlet openings 46a (Figs. 3 and 5) therein in communication with the interior portion of housing 32 adjacent thereto. Spring 45 maintains a valve button 47 disposed on the outer end of the piston in contact with bell crank 14 positioned adjacent thereto. An internally threaded nut 48 (Figs. 3 and 5) provided with radially extending projections 48a on the outer periphery thereof is positioned adjacent the inner end of housing 32 and fixed thereto by bolts or other similar means. Nut 48 is slidably mounted in a sleeve 49 (Figs. 3 and 5) having longitudinally extending slots therein adapted to receive nut projections 48a. Sleeve 49 is prevented from rotating relative to housing 18 by a set screw 52 (Fig. 5) extending through the housing. Nut 48 is adapted to receive a hollow compensator screw 53 fixed to hub 24 and connected to control shaft 12 by bolt 53a. A spring 55 mounted on housing 46 and extending into screw 53 eliminates any slack between nut 48 and said compensator screw.

Fluid outlet drains 56 and 57, and 58 (Fig. 5), are provided for discharging fluid from the valve housing. Drains 56 are disposed in housing 32 adjacent piston recess 41 while drains 57 are positioned therein adjacent spring housing 46. Drains 58 are disposed in actuator housing 18 adjacent drains 57.

In operation, when pressure control means 16 is actuated to move rod 15 upwardly, the rod rotates bell crank 14 in a counterclockwise direction. Bell crank 14 moves button 47 and piston 39 axially in valve housing 32 in a direction toward control shaft 12 until recess 40 communicates with groove 32a and passages 28 and recess 41 communicates with groove 32b and passages 29. Oil, pumped from sump 36 through line 37 and floating sleeve 33 into recess 42, enters through apertures 43 into the interior of piston 39. Thereafter, the oil flows through apertures 44, recess 40, passages 28, and recesses 30, into rotor recesses 26 disposed adjacent rotor 21. The oil thereafter presses against rotor vanes 22 causing rotor 21, compensator screw 53, and control shaft 12 fixed to the rotor, to move or rotate counterclockwise in housing 18, as indicated by the arrow in Figure 2. Thus, control shaft 12 is angularly displaced or shifted with respect to housing 18 and eccentric shaft 13. Since screw 53 is threadably engaged within nut 48 and nut 48 is prevented from rotating by radially extending projections 48a positioned in slotted sleeve 49 fixed to housing 18, the counterclockwise rotation of screw 53 causes nut 48 to move or slide axially on the screw in the direction toward control shaft 12. Since nut 48 is fixed to valve housing 32, the housing moves axially therewith following the axial displacement of piston 39 to close off communication of recess 40 with passages 28 and recess 41 with passages 29 to prevent flow of oil under pressure to rotor 21. Thus, the present invention provides control means for displacing or shifting one rotatable shaft with respect to another rotatable shaft and which means automatically actuates a compensating means which returns the valve therein to its no-flow position upon completion of the displacement.

When a vane 22 rotates in the housing to a point adjacent recesses 31, the oil passes out the opposite end of rotor recesses 26 through passages 29, piston recess 41 and drains 56, and is returned to pump sump 36.

When pressure control means 16 is actuated to move rod 15 downwardly, the rod rotates bell crank 14 in a clockwise direction. Spring 45 thereafter moves piston 39 axially in valve housing 32 in the direction away from control shaft 12 until recess 40 communicates with groove 32b and passages 29 and groove 32a is in communication with the interior of valve housing 32 and spring housing 46. Oil pumped from sump 36 through line 37 and sleeve 33 into recess 42, thereafter flows through apertures 43 into the interior of piston 39. Thereafter the oil flows through apertures 44, recess 40, groove 32b, passages 29 and recesses 31 into rotor recesses 26 adjacent rotor 21. The oil thereafter presses against rotor vanes 22 causing rotor 21 and compensator screw 53 and control shaft 12 fixed to the rotor to move or rotate clockwise in the housing 18 to angularly displace control shaft 12 with respect to eccentric shaft 13. Since screw 53 is threadably engaged within nut 48 and nut 48 is prevented from rotating by radially extending projections 48a positioned in slotted sleeve 49 fixed to housing 18, the clockwise rotation of screw 53 causes nut 48 to move or slide axially on the screw in the direction away from the control shaft 12. Valve housing 32 moves axially with the nut and follows the axial displacement of piston 39 to close off communication of recess 40 with passages 29 and communication of groove 32a with the interior of the valve housing 32 and spring housing 46 to prevent flow of oil under pressure to rotor 21.

When a vane rotates in the housing to a point adjacent recesses 30 the oil flows out of the recesses 26 thereafter flowing through passages 28, groove 32a, valve housing 32, spring housing 46, apertures 46a and drains 57 and 58 and is returned to pump sump 36.

It will be understood that changes may be made in the form, location, materials used in the construction of and arrangement of the various parts of the apparatus disclosed herein without departing from the principles of the invention which is not to be limited excepting by the scope of the appended claims.

What is claimed is:

1. An actuator for rotatably shifting one shaft with respect to another shaft by fluid under pressure comprising a housing fixed to said other shaft, impeller means disposed in said housing and fixed to said one shaft, passage means in communication with said impeller means for flowing fluid under pressure therethrough to rotate said impeller means and for flowing fluid discharged from said impeller means therethrough, valve means associated with said passage means to control the flow of fluid therethrough comprising a valve housing disposed for axial movement within said actuator housing, a piston valve in the valve housing, radial extensions disposed on the valve housing, a sleeve arranged over the valve housing with longitudinally extending slots adapted to receive said radial extensions, said sleeve being fixed to said actuator housing, actuating means operatively associated with said piston valve to move said piston valve in one direction to permit the flow of fluid under pressure through one of said passage means to rotate said impeller means in one direction, and to move said piston valve in the opposite direction to permit the flow of fluid under pressure through another of said passage means to rotate said impeller means in an opposite direction, control means acting on said valve actuating means to move said valve actuating means, and screw means fixed to said one shaft and adapted to thread into said valve housing adjacent said radial extensions for axially sliding said valve housing in the direction of the axial displacement of said piston valve to close off communication of said passage means with said impeller means to stop the flow of fluid therethrough.

2. An actuator for rotatably shifting one shaft with respect to another shaft by fluid under pressure comprising a housing fixed to said other shaft, impeller means disposed in said housing and fixed to said one shaft, passages in communication with said impeller means for flowing fluid under pressure therethrough to rotate said impeller means and for flowing fluid discharged from said impeller means therethrough, valve means associated with said passage means to control the flow of fluid therethrough comprising a valve housing disposed for axial movement in said actuator housing, a piston valve in the valve housing, said valve housing having inlet and outlet ports disposed on the inner periphery thereof in communication with said passages, an internally threaded nut connected to the valve housing having radial extensions thereon, a sleeve with longitudinally extending slots, said sleeve being fixed to the actuator housing and mounted over said nut to receive the radial extensions thereon, actuating means operatively associated with said piston valve to move said piston valve in one direction to permit the flow of fluid under pressure through one of said passage means to rotate said impeller means in one direction, and to move said piston valve in the opposite direction to permit the flow of fluid under pressure through another of said passage means to rotate said impeller means in an opposite direction, control means acting on said valve actuating means to move said valve actuating means, and an externally threaded screw fixed to said one shaft and threadedly engaging said internally threaded nut for axially sliding said valve housing in the direction of the axial displacement of said piston valve to close off communication of said passage means with said impeller means to stop the flow of fluid therethrough.

3. An actuator for angularly displacing an inner shaft with respect to an outer shaft disposed thereover by fluid under pressure comprising a housing, a rotor disposed in said housing and fixed to said inner shaft, said housing having recesses on the inner periphery thereof adjacent said rotor, radially extending vanes on said rotor, tension means for maintaining said vanes in contact with the housing recesses, passages in communication with the opposite ends of said recesses for flowing fluid under pressure therethrough to rotate said rotor and for flowing fluid discharged from said rotor therethrough, a valve housing disposed for axial movement in the actuator housing, a piston valve in the valve housing to control the flow of fluid through said passages, said valve housing having inlet and outlet ports on the inner periphery thereof in communication with said passages, an internally threaded nut connected to the valve housing adjacent the inner end thereof having radial extensions thereon, a sleeve mounted on said nut having longitudinally extending slots adapted to receive said radial extensions, said sleeve being fixed to said actuator housing, actuating means operatively associated with said piston valve to move said piston valve in one direction to permit the flow of fluid under pressure through one of said passages to rotate said rotor in one direction, and to move said piston valve in the opposite direction to permit the flow of fluid under pressure through another of said passages to rotate said rotor in an opposite direction, pressure control means acting on said valve actuating means to move said valve actuating means in response to changes in pressure, and an externally threaded screw fixed to said inner shaft and threadably engaging said nut for axially sliding said valve housing in the direction of the axial displacement of said piston valve to close off communication of said passages with said housing recesses to stop the flow of fluid thereto.

4. In a variable capacity plunger type pump having a rotatable control shaft positioned within a hollow eccentric shaft, an actuator for rotatably shifting said control shaft with respect to said eccentric shaft by fluid under pressure comprising a housing fixed to said eccentric shaft, impeller means disposed in said housing and fixed to said control shaft, passage means in communication with said impeller means for flowing fluid under pressure therethrough to rotate said impeller means and for flowing fluid discharged from said impeller means therethrough, valve means associated with said passage means to control the flow of fluid therethrough comprising a valve housing disposed for axial movement within said actuator housing, a piston valve in the valve housing, radial extensions disposed on the valve housing, a sleeve arranged over the valve housing with longitudinally extending slots adapted to receive said radial extensions, said sleeve being fixed to said actuator housing, actuating means operatively associated with said piston valve to move said piston valve in one direction to permit the flow of fluid under pressure through one of said passage means to rotate said impeller means in one direction, and to move said piston valve in the opposite direction to permit the flow of fluid under pressure through another of said passage means to rotate said impeller means in an opposite direction, control means acting on said valve actuating means to move said valve actuating means, and screw means fixed to said one shaft and adapted to thread into said valve housing adjacent said radial extensions for axially sliding said valve housing in the direction of axial displacement of said piston valve to close off communication of said passage means with said impeller means to stop the flow of fluid therethrough.

5. In a variable capacity plunger type pump having a rotatable control shaft positioned within a hollow eccentric shaft, an actuator for angularly displacing said control shaft with respect to said eccentric shaft by fluid under pressure comprising, a housing having recesses disposed on the inner periphery thereof opposite one another, a rotor fixed to said control shaft disposed in said housing adjacent said recesses, radially extending vanes mounted in said rotor, tension means for maintaining said vanes in engagement with said recesses and the inner periphery of said housing, axially extending passages disposed in said housing in communication with the ends of said recesses for flowing fluid under pressure therethrough to rotate said rotor and for flowing fluid discharged from said rotor therethrough, a valve housing disposed for axial movement in the actuator housing, a piston valve in the valve housing to control the flow of fluid through said passages, said valve housing having inlet and outlet ports on the inner periphery thereof in communication with said passages, a portion of said valve housing extending outside of the actuator housing, a floating sleeve loosely mounted on said valve housing portion for axial movement therewith having a circumferential recess on the inner periphery thereof in communication with said valve housing, an internally threaded nut connected to the valve housing adjacent the inner end thereof having radial extensions thereon, a sleeve mounted on said nut having longitudinally extending slots adapted to receive said radial extensions, said sleeve being fixed to said actuator housing, bell crank means operatively associated with said piston valve to move said piston valve in one direction to permit the flow of fluid under pressure through one of said passages to rotate said rotor in one direction, spring means operatively associated with said piston valve to move said piston valve in the opposite direction to permit the flow of fluid under pressure through another of said passages to rotate said rotor in an opposite direction, pressure control means acting on said bell crank means to move said bell crank means in response to changes in pressure, and an externally threaded screw fixed to said control shaft and threaded into said nut for axially sliding said valve housing in the direction of the axial movement of said piston valve to close off communication of said passages with said housing recesses to stop the flow of fluid thereto.

6. In a variable capacity plunger type pump having a rotatable control shaft positioned within a hollow eccentric shaft, an actuator for rotatably shifting said control shaft with respect to said eccentric shaft by fluid under pressure comprising a housing fixed to said eccentric shaft, impeller means disposed in said housing and fixed to said control shaft, passages in communication with said impeller means for flowing fluid under pressure therethrough to rotate said impeller means and for flowing fluid discharged from said impeller means therethrough, valve means associated with said passage means to control the flow of fluid therethrough comprising a valve housing disposed for axial movement in said actuator housing, a piston valve in the valve housing, said valve housing having inlet and outlet ports disposed on the inner periphery thereof in communication with said passages, an internally threaded nut connected to the valve housing having radial extensions thereon, a sleeve with longitudinally extending slots, said sleeve being fixed to the actuator housing and mounted over said nut to receive the radial extensions thereon, actuating means operatively associated with said piston valve to move said piston valve in one direction to permit the flow of fluid under pressure through one of said passage means to rotate said impeller means in one direction, and to move said piston valve in the opposite direction to permit the flow of fluid under pressure through another of said passage means to rotate said impeller means in an opposite direction, control means acting on said valve actuating means to move said valve actuating means, and an externally threaded screw fixed to said control shaft and threadably engaging said internally threaded nut for axially sliding said valve housing in the direction of the axial displacement of said piston valve to close off communication of said passage means with said impeller means to stop the flow of fluid therethrough.

References Cited in the file of this patent

UNITED STATES PATENTS

| 668,938 | Noordaa | Feb. 26, 1901 |
| 1,467,209 | Sumner | Sept. 4, 1923 |
| 1,944,999 | Rayburn | Jan. 30, 1934 |
| 2,349,838 | Alexandersson et al. | May 30, 1944 |
| 2,521,557 | Wyckoff | Sept. 5, 1950 |

FOREIGN PATENTS

| 665,733 | Great Britain | Jan. 30, 1952 |
| 673,374 | Great Britain | June 4, 1952 |